June 30, 1970   J. V. MOLNAR   3,518,520
SPEED CONTROL CIRCUITS WITH LINE VOLTAGE COMPENSATION
FOR D.C. MOTORS
Filed Dec. 1, 1967
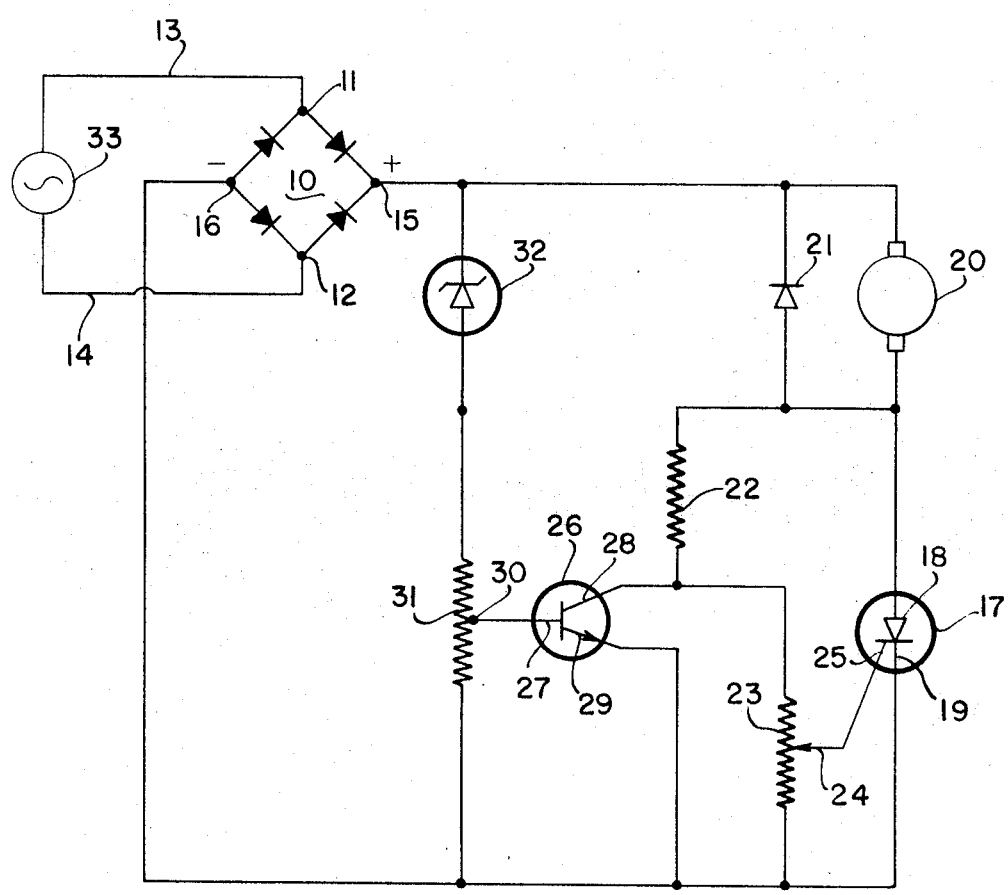
INVENTOR.
James V. Molnar
Witness
BY
Rosalind Tsai
Marshall J. Breen
ATTORNEY

United States Patent Office 3,518,520
Patented June 30, 1970

3,518,520
SPEED CONTROL CIRCUITS WITH LINE VOLTAGE COMPENSATION FOR D.C. MOTORS
James V. Molnar, Lake Parsippany, N.J., assignor to The Singer Company, New York, N.Y., a corporation of New Jersey
Filed Dec. 1, 1967, Ser. No. 687,199
Int. Cl. H02p 7/28
U.S. Cl. 318—331                    2 Claims

ABSTRACT OF THE DISCLOSURE

A circuit for controlling the speed of a D.C. motor from a full-wave rectified A.C. voltage source employs a single SCR having a triggering voltage supplied from a variably tapped resistance voltage divider connected in series with the motor armature across the voltage source. A transistor has its base bias obtained from a resistance divider connected in series with a Zener diode across the voltage source. The collector-emitter circuit of the transistor is connected to shunt the tapped resistance. Polarity is such that increased positive base bias voltage drives the transistor further into conduction to shunt more current around the tapped resistance and lower the triggering voltage, thus compensating for the increased line voltage.

BACKGROUND OF THE INVENTION

The prior art circuits which employ SCR's to variably control power current flow to electric motors responsively to speed change in order to regulate the speed are, in general, unable to maintain a constant motor speed when the input or line voltage is caused to vary. This is a compound difficulty because, not only does the voltage available for motor power vary, but also the voltage available for triggering the SCR varies and always in the direction to more adversely affect the speed situation which is already bad enough due to the motor power voltage variation alone.

SUMMARY OF THE INVENTION

The present invention therefore seeks to correct by simple circuit means the above-noted difficulty and provides compensation for speed changes due to line voltage variation by making the SCR fire later in the cycle for increasing line voltage above a predetermined minimum voltage.

This is accomplished according to the present invention by using a transistor in its active mode as a variable impedance shunt across a resistance which provides the triggering voltage for the SCR. The transistor derives its base bias voltage from a resistance connected in series with a Zener diode across the source voltage. At source voltage below the breakdown value of the Zener diode, the forward base current is nil and the transistor is essentially cut-off and the shunting effect is nil. However, as the source voltage rises above the Zener breakdown value, the forward base current increases and drives the transistor more into conduction, thus increasing its shunting effect across the resistance providing the triggering voltage for the SCR. The net effect of this circuit arrangement is to delay the firing of the SCR in each cycle proportionally more as the source voltage increases and this compensates for speed variation by making the *increased* voltage available to the motor for a *shorter time* in each cycle so that the speed remains substantially contsant.

The single figure is a circuit diagram illustrating a preferred embodiment of this invention.

DESCRIPTION OF A PREFERRED EMBODIMENT

Referring to the single figure, it will be seen that a full-wave bridge rectifier 10 has input terminals 11 and 12 connected to lines 13 and 14 respectively, which latter are adapted to be connected to a conventional source of A.C. voltage 33.

The bridge rectifier 10 has output terminals 15 and 16 of the polarity indicated and it will be understood that with the input terminals 13 and 14 connected to a source of A.C. voltage 33, the voltage available at terminals 15 and 16 will be full-wave rectified A.C. voltage with terminal 15 positive with respect to terminal 16.

A silicon controlled rectifier (SCR) 17 has its anode 18 and cathode 19 connected in series with armature winding 20 of a permanent magnet type D.C. motor across the terminals 15 and 16 to supply the power current for the motor. A free-wheeling diode 21 is connected in shunt with the armature winding 20 in conventional manner.

A first voltage-divider comprising fixed resistance 22 and potentiometer resistance 23 in series therewith is connected in shunt with the anode-cathode circuit 18–19. A sliding tap 24 on the potentiometer resistance 23 is connected to the gate 25 of the SCR 17.

A transistor 26 has a base 27, a collector 28 and an emitter 29. The base 27 is connected to an intermediate tap 30 on a resistance 31 which, in series with a Zener diode 32, forms a second voltage divider across the terminals 15–16.

The collector-emitter circuit 28–29 of the transistor 26 is connected in shunt with the resistance 23.

The operation of the above-described circuit is as follows:

The Zener breakdown voltage of the Zener diode 32 establishes the minimum voltage at terminals 15–16 at which forward bias voltage begins to be applied to the base 27. At this point, the transistor 26 is substantially cut off so that the impedance of its collector-emitter circuit 28–29 is very high and has negligible shunting effect on the resistance 23. Under these conditions, the triggering voltage supplied by tap 24 to the gate 25 is determined only by the source voltage at terminals 15–16 and the back E.M.F. of the armature winding 20.

However, as the source voltage at terminals 15–16 increases due to increased A.C. line voltage across terminals 13–14, the forward bias voltage on base 27 increases and drives transistor 26 into conduction and lowers its collector-emitter circuit impedance so that current begins to be shunted around the resistance 23 and the trigger voltage available at tap 24 is reduced and the SCR 17, is caused to fire *later* in the cycle than would be the case if the shunting effect were not present. Thus, even though the voltage available at terminals 15–16 has increased, it is supplied to the motor armature 20 later in each half cycle so that the effective power current remains about the same and the speed does not increase but remains substantially the same for any fixed setting of the tap 24.

It will be seen that the above automatic compensating effect continues over a range of increasing source voltage until the transistor 26 is substantially saturated and no further increase in shunting of the resistance 23 is possible. The Zener voltage thus establishes the source voltage at which compensation begins and the range over which it is effective is a function of the dynamic characteristics of the transistor 26.

While the transistor 26 is shown in a common emitter configuration only for purposes of disclosure, it will be understood that other configurations will be obvious to those skilled in the art and are to be included within the scope of this invention. It will further be understood that the resistance 22 may be included as part of the potentiometer resistance 23 if desired. Its presence as a separate fixed resistance 22 is only for the purpose of limiting the maximum current handled by the transistor 26 in the saturated region and makes the use of a small low-cost transistor feasible in this application.

Having thus set forth the nature of this invention, what is claimed herein is:

1. An electric motor system comprising a source of full-wave rectified A.C. voltage having first and second output terminals of opposite polarity, a D.C. motor having an armature winding, a solid-state controlled rectifier having an anode, a cathode and a gate, circuit means connecting the armature winding in series with the anode and cathode across the output terminals, first voltage divider means including a first resistance connected across the anode-cathode circuit of the controlled rectifier, said first resistance having a sliding tap connected to the gate, a transistor having a base, an emitter and a collector, second voltage divider means including a Zener diode and a second resistance connected in series across the output terminals, said base being connected to an intermediate point on said second resistance, and means connecting said emitter and said collector respectively to separate points on said first resistance on opposite sides of said sliding tap.

2. An electric motor system in accordance with claim 1 wherein the transistor is operated in its active region for variations in the source voltage above a minimum value set by the Zener breakdown voltage of the Zener diode.

References Cited

UNITED STATES PATENTS

| 3,242,410 | 3/1966 | Cockrell | 318—331 |
| 3,343,060 | 9/1967 | Ingraham | 323—22 X |
| 3,374,758 | 3/1968 | Mais | 318—331 X |
| 3,412,314 | 11/1968 | Crane | 323—22 X |

ORIS L. RADER, Primary Examiner

THOMAS LANGER, Assistant Examiner

U.S. Cl. X.R.

318—341